Feb. 7, 1939.   C. D. BRIDDELL   2,146,464
ATTACHMENT FOR ANIMAL TRAPS
Filed Aug. 26, 1936   2 Sheets-Sheet 1
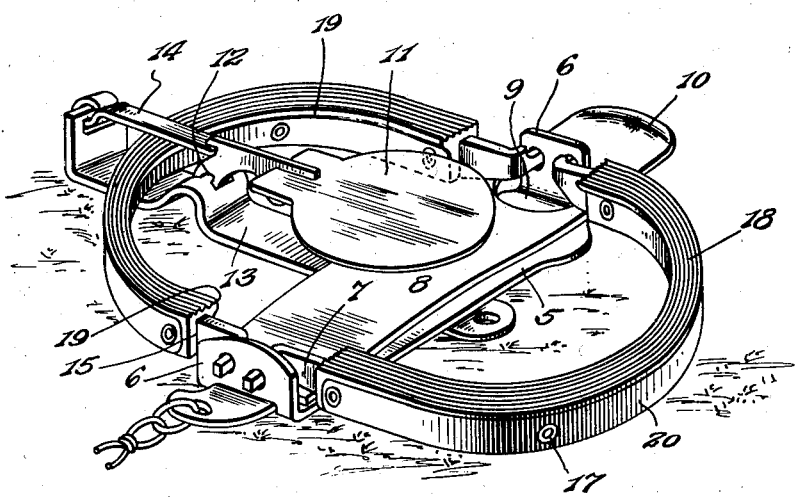
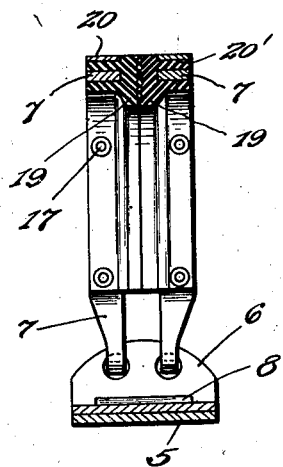
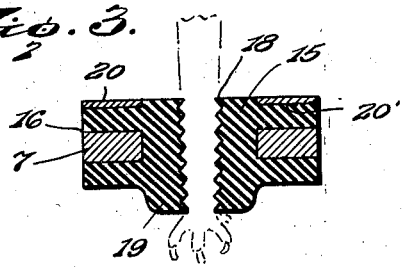
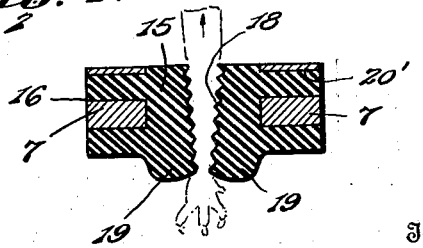
Inventor
C. D. Briddell.
By Lacey & Lacey, Attorney.

Feb. 7, 1939. C. D. BRIDDELL 2,146,464
ATTACHMENT FOR ANIMAL TRAPS
Filed Aug. 26, 1936 2 Sheets-Sheet 2
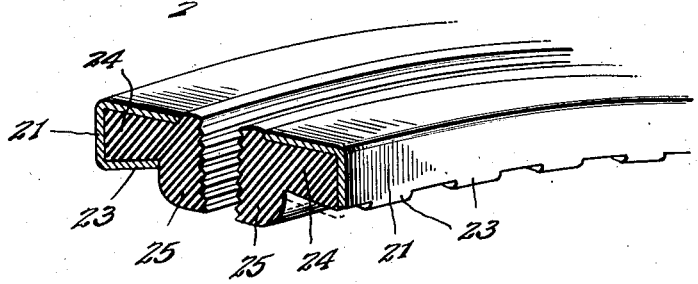
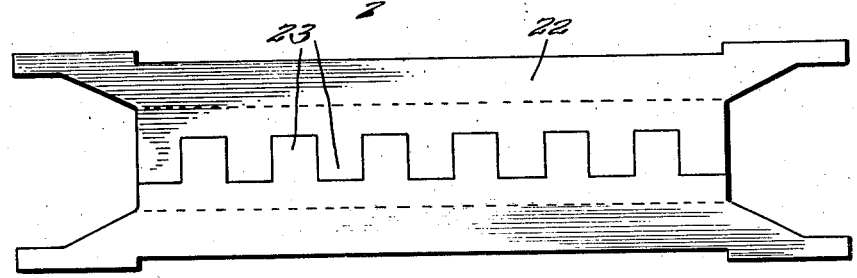
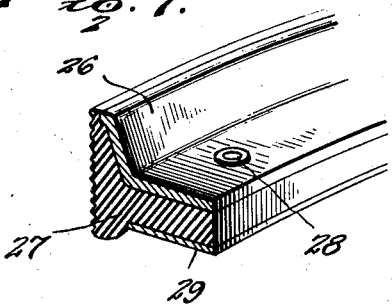
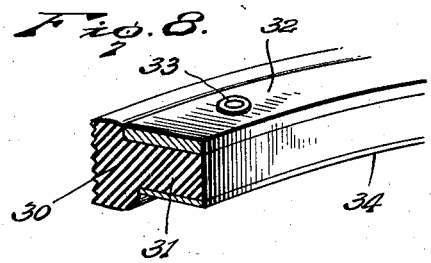
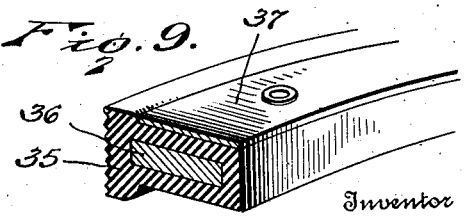
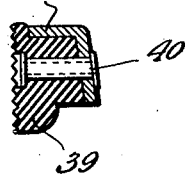
Inventor
C. D. Briddell.
By Lacey & Lacey, Attorneys Patented Feb. 7, 1939

2,146,464

UNITED STATES PATENT OFFICE 2,146,464

ATTACHMENT FOR ANIMAL TRAPS

Charles D. Briddell, Crisfield, Md.

Application August 26, 1936, Serial No. 98,034

11 Claims. (Cl. 43—90)

This invention relates to animal traps and more particularly to a yieldable shield or cushion for the gripping jaws thereof.

The object of the invention is to provide an animal trap, the confronting faces of the jaws of which are provided with yieldable protecting shields whereby effectually to grip an animal caught between said jaws without liability of crushing the bones of the animal or tearing the flesh so that when the animal is released from the trap the pelt will be intact.

A further object of the invention is to form the jaw facings or shields with yieldable ribs or lips adapted to be distorted or rolled toward each other for increasing the grip on the caught portion of an animal when a pull is exerted by the animal in a direction away from the trap in an attempt to effect its release.

A further object is to provide means for preventing an animal from biting or gnawing the yieldable facings or shields in an effort to obtain access to the portion of its body between the jaws with a view to cutting or gnawing through said caught portion and escaping from the trap.

A further object is to provide a cushioning member which will minimize pain incident to impalement so that an animal will not try to free itself in an effort to relieve its suffering by twisting and wiggling its body and, as a result, cause the sharp edges of the jaws to cut into or entirely sever the bone and flesh and permit the animal to escape, which often occurs with ordinary steel jaw traps.

A further object is to provide a shield or cushion which may be quickly and conveniently applied to the gripping jaws of any standard make of jaw trap without necessitating any structural changes therein.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a perspective view of a jaw trap provided with a yieldable shield or cushion embodying the present invention, the jaws of the trap being shown in open or set position.

Figure 2 is a vertical sectional view showing the jaws closed,

Figure 3 is an enlarged detail sectional view showing the position of the confronting faces of the jaws of the trap when the leg of an animal is caught therebetween, Figure 4 is a similar view showing the rolling action of the coacting flexible ribs or lips of the cushioning member to increase the gripping effect on the caught portion of an animal should the animal attempt to forcibly pull its leg from between said jaws, Figure 5 is a detail sectional perspective view illustrating a modified form of the invention, Figure 6 is a plan view showing the manner of stamping out the jaws illustrated in Figure 5, and Figures 7, 8, 9 and 10 are detail sectional perspective views illustrating further modifications of the invention.

The improved cushion or shield forming the subject-matter of the present invention may be used in connection with any type of standard jaw trap, and by way of illustration is shown in Figure 1 in connection with a conventional form of trap, in which 5 designates the base spring having oppositely disposed upstanding ears 6 in which are pivotally mounted gripping jaws, indicated at 7. Secured to one end of the base plate 5 is a spring bar 8 having an opening 9 formed therein through which the jaws 7 pass, the free end of the spring bar being slightly dished or concave to form a terminal unstanding lip 10 to assist in preventing slipping of the hand of the operator when depressing the bar to effect the setting of the trap. The trap is provided with the usual trip pan 11 pivotally mounted at 12 on a transverse bar 13 and adapted to engage a pivoted trigger 14 for holding the pan in a set position. The parts just described, with the exception of the guard lip 10, are of the usual construction and form no part of the present invention, the salient feature of which resides in the construction of the yieldable shields or cushions for the confronting faces of the gripping jaws which will now be described in detail.

The yieldable shields or facings for the jaws are indicated as a whole at 15, said shields being preferably moulded or otherwise formed from relatively soft rubber or other yieldable material curved to conform to and adapted to fit over the coacting jaws of the trap, as best shown in Figure 3 of the drawings. Each facing strip or shield is provided with a seating recess 16 adapted to receive the adjacent jaw 7 and to which it is rigidly secured by tubular eyelets or similar fastening devices 17. The inner face of each shield 15 projects a short distance beyond the inner face of the adjacent jaw 7 so as to form a yieldable pad or cushion for contact with the leg or other portion of an animal and the inner or confronting faces of the shields are preferably corrugated longitudinally, as indicated at 18, to provide a roughened surface and thus assist in increasing the gripping action on the impaled portion of an animal. Each yieldable shield 15 is provided with an integral depending lip or rib 19 of sufficient length to permit free inward flexing or rolling thereof when an animal attempts to withdraw its leg or other caught portion from between the jaws. The ribs or lips are co-extensive in length with the shields 15 and the inner faces of the lips are also preferably corrugated, as shown.

By reference to Figure 4 of the drawings, it will be seen that should the leg of an animal be caught between the jaws of the trap and the animal attempt to effect its release by exerting an outward tug or pull on said caught portion the lips 19 will be distorted or rolled inwardly and upwardly against the animal's leg, thereby increasing the grip on the leg and effectually preventing escape of the animal. Owing, however, to the nature of the yieldable material of which the shields and lips are formed, the animal's leg will not be broken or the flesh torn or lacerated so that when the animal is removed from the trap the pelt thereof will be intact. The harder the animal pulls to effect the release of its leg, the greater the gripping action of the active faces of the lips 19 thereon so that once an animal is caught in the trap it is practically impossible for it to escape.

In order to prevent an animal from biting or gnawing away the rubber at the confronting faces of the shields 15 in an effort to obtain access to the portion of its body caught between the jaws with a view to effecting its release by gnawing or cutting through the impaled portion of its body, I have provided metal plates 20 curved to conform to the shape of the jaws and to which they are secured by the tubular eyelets or rivets 17. The plates 20 are of approximately the same width as the jaws 7 so as to allow free cushioning action of the yieldable shields 15. These plates 20 preferably fit in shallow seats or depressions 20' in the upper edges of the shields and form a sufficient protection and covering for said upper edges to prevent a muskrat or other animal from biting its way through the rubber to the portion of its anatomy caught between the jaws. As the shields are pre-formed or molded with the seating recesses 16 therein, they may be readily attached to the gripping jaws of any standard style of trap by fitting the shields over the jaws with the metal strips 20 in position thereon and then applying the tubular rivets 17, as will be readily understood. A trap constructed in accordance with the present invention will not only effectually grip and hold an animal caught therein but owing to the cushioning effect of the shields and resilient lips the bones of the animal will not be crushed nor the flesh lacerated, thereby rendering the trap humane in character.

In Figures 5 and 6 of the drawings, there is illustrated a modified form of the invention in which the separate metal protecting strips 20 are dispensed with. In this form of the device, the gripping jaws 21 of the trap are preferably stamped from a single sheet of metal 22 cut along its medial longitudinal axis to provide laterally extending gripping tongues 23 adapted to be bent inwardly and upwardly against dovetailed extensions 24 on the yieldable shields 25 whereby said shields will be securely held in position on the jaws 21 without the employment of tubular eyelets, rivets or similar fastening devices. In this form of the device, the metal at the upper surface of the jaws 21 serves as a guard or shield and prevents the animal from gnawing through the rubber in an attempt to release an impaled portion of its body, as will be readily understood.

In Figure 7 of the drawings, the gripping jaws 26 of the trap are substantially L-shaped in cross section and the shield 27 secured to the lower face thereof by tubular rivets or eyelets 28 which also extends through a metallic binding strip 29. In Figure 8 of the drawings, the yieldable strip 30 instead of being formed with a seating recess for the reception of the jaw, as illustrated in Figure 1, is provided with a reduced neck or extension 31 which is secured to the under side of the gripping jaw 32 by tubular eyelets 33, the lower ends of which are clinched against a metallic binding strip 34. In Figure 9 of the drawings, the yieldable shield 35 is formed with a longitudinally extending passage which receives the gripping jaw 36 of the trap, the upper surface of the yieldable shield being protected by a metallic plate 37. If desired, the gripping jaws may be of inverted L-shape, as indicated at 38 in Figure 10 of the drawings, and in which event the yieldable shield 39 will fit in the angle of the jaw and be secured thereto by a tubular bolt or rivet 40, the head of which is counter-sunk in the corrugated face of the yieldable shield, as shown.

It will be observed that in all forms of the invention, the confronting face of each yieldable cushion or shield is corrugated and provided with a depending yieldable lip or rib which coacts with the yieldable rib of an adjacent jaw for the purpose of increasing the grip on the leg of an animal should said animal attempt to pull its leg from between the jaws in an attempt to escape.

It will, of course, be understood that the devices may be made in different sizes and shapes according to the type of trap to which they are applied and may be formed of any suitable yieldable material capable of exerting a gripping action on a trapped animal without crushing the bones of the animal or cutting or otherwise injuring the pelt thereof.

Having thus described the invention, what is claimed as new is:

1. In a trap, companion jaws coacting to grip a portion of an animal, and protecting shields for the confronting faces of said jaws, each shield having a depending pliable rib extending longitudinally thereof and adapted to be distorted and tightly grip the caught portion of an animal when the animal attempts to withdraw the said caught portion from between the jaws.

2. An animal trap comprising companion jaws, strips of yieldable material covering the confronting faces of said jaws and each provided with a depending longitudinally extending flexible rib disposed under the jaw with its outer edge face coextensive with the side face of the strip, said ribs coacting with the body portions of the strips to engage an animal caught between said jaws and adapted to be distorted transversely to increase the grip on the animal should said animal attempt to pull its caught portion from between the jaws.

3. An animal trap comprising companion jaws, a strip of yieldable material covering the confronting face of each jaw and provided with an integral depending flexible rib of an appreciable width and being coextensive with the side face of the body portion of the strip and adapted to be distorted transversely and coact with the rib of a companion jaw to engage an animal caught between said jaws, whereby should the animal attempt to escape from the trap the ribs will increase the grip on said animal.

4. In a trap, companion jaws coacting to grip a portion of an animal, yieldable shields covering the confronting inner side faces of said jaws and formed with depending ribs in advance of the jaws adapted to be distorted towards each other when pull is exerted upon a portion of an animal caught between the jaws, and protecting strips covering surfaces of the shields opposite the jaws and terminating short of the inner faces of said shields.

5. In a trap, companion jaws coacting to grip an animal, cushioning shields of yieldable material covering said jaws and having their confronting faces provided with longitudinally disposed corrugations, the shields having integral extensions forming depending ribs flush with the said confronting faces of the shields and adapted to be distorted towards each other and a protecting strip covering the outer surface of each shield and terminating short of the inner face thereof.

6. In a trap, companion jaws coacting to grip a portion of an animal, yieldable shields having seating recesses therein receiving the jaws and having their confronting faces roughened and provided with depending flexible ribs coacting to engage an animal caught in the trap and increase the holding power of the jaws.

7. In a trap, companion jaws coacting to grip a portion of an animal, shields of yieldable material having seating recesses therein adapted to receive the jaws, each shield being provided with an integral depending flexible rib, a protecting strip secured to the outer surface of each shield and terminating short of the inner face of the shield, and fastening devices extending through each protecting strip, shield and the adjacent jaw.

8. In an animal trap, coacting hollow jaws each provided with inwardly extending securing tongues, cushioning members seated in the hollow jaws and having their confronting faces roughened and provided with depending flexible ribs, said tongues being pressed against the cushioning members for retaining said cushioning members within the hollow jaws.

9. In a trap, coacting hollow jaws adapted to grip an animal and each provided with a substantially dovetailed seat defining inwardly projecting securing tongues, cushioning members having dovetailed extensions fitted in said seats and having their confronting faces longitudinally corrugated and provided with depending flexible ribs adapted to roll toward each other and grip the portion of an animal caught between the jaws should the animal attempt to pull the caught portion from said jaws.

10. In a trap, companion jaws coacting to grip a portion of an animal between them, shields of yieldable material secured to the jaws and forming cushions at the confronting faces of said jaws, the cushion forming portions being extended downwardly to provide depending deformable ribs and said shields having their upper surfaces provided with seats, a protecting member fitted in each seat and terminating short of the adjacent cushion, and fastening devices extending through the jaws, shields and protecting members.

11. A cushioning member for the gripping jaws of animal traps comprising an elongated body portion of yieldable material having means at one side thereof for attachment to the jaw of a trap and provided at its other side with a yieldable gripping member terminating in a depending extension constituting a deformable rib of appreciable width disposed entirely under the body and having a side face forming a continuation of the side face of said gripping member.

CHARLES D. BRIDDELL.